US012122559B2

(12) United States Patent
Woolery

(10) Patent No.: US 12,122,559 B2
(45) Date of Patent: Oct. 22, 2024

(54) TOOL HOLDING SYSTEM, METHOD AND DEVICE WITH COVER SHEET

(71) Applicant: MagnoGrip Inc., Miami, FL (US)

(72) Inventor: Andre A. Woolery, Miami, FL (US)

(73) Assignee: MAGNOGRIP INC., Miami, FL (US)

( * ) Notice: Subject to any disclaimer, the term of this patent is extended or adjusted under 35 U.S.C. 154(b) by 374 days.

(21) Appl. No.: 17/534,756

(22) Filed: Nov. 24, 2021

(65) Prior Publication Data

US 2023/0159226 A1 May 25, 2023

(51) Int. Cl.
*B65D 25/00* (2006.01)
*B25H 3/02* (2006.01)
*B65D 25/20* (2006.01)
*B65D 25/28* (2006.01)
*B65D 25/34* (2006.01)

(52) U.S. Cl.
CPC ............... *B65D 25/34* (2013.01); *B25H 3/02* (2013.01); *B65D 25/20* (2013.01); *B65D 25/2823* (2013.01)

(58) Field of Classification Search
CPC .................................... B25H 3/00; B25H 3/02
See application file for complete search history.

(56) References Cited

U.S. PATENT DOCUMENTS

| | | | |
|---|---|---|---|
| 178,611 | A | 6/1876 | Dye |
| 625,423 | A | 5/1899 | Scriven et al. |
| D59,955 | S | 12/1921 | Farnham |
| 1,724,069 | A | 8/1929 | Butera |
| 2,212,326 | A | 8/1940 | Piken |
| D154,436 | S | 3/1946 | Solworth |
| 2,456,445 | A | 12/1948 | Rees et al. |
| 2,597,601 | A | 5/1952 | Sherman |
| 2,910,804 | A | 11/1959 | White |
| 3,007,568 | A | 11/1961 | Kurland |
| 3,008,617 | A | 11/1961 | Villwock |
| 3,045,862 | A | 7/1962 | Chelbor |
| 3,045,863 | A | 7/1962 | Chelbor |
| 3,063,595 | A | 11/1962 | Smith et al. |
| 3,161,932 | A | 12/1964 | Seymour |
| 3,180,641 | A | 4/1965 | Shane |
| 3,220,018 | A | 11/1965 | Johnson |
| 3,256,529 | A | 6/1966 | Panepinto |
| 3,298,579 | A | 1/1967 | Smith |
| D212,995 | S | 12/1968 | Myers |

(Continued)

FOREIGN PATENT DOCUMENTS

| | | | |
|---|---|---|---|
| CN | 201986921 | U | 9/2011 |
| FR | 2747274 | A1 | 10/1997 |

(Continued)

OTHER PUBLICATIONS www.dickblick.com BLICK art materials, “Super Brush Holder”, 2 pages.

(Continued)

*Primary Examiner* — Eyamindae C Jallow
(74) *Attorney, Agent, or Firm* — Haverstock and Owens, A Law Corporation

(57) ABSTRACT

A tool holding system and device includes a tool holder having a primary storage compartment for removably holding one or more tools, a secondary storage compartment for receiving a parts bin and a cover pouch for holding a cover sheet.

27 Claims, 11 Drawing Sheets

(56) References Cited

U.S. PATENT DOCUMENTS

| | | | |
|---|---|---|---|
| D218,722 S | 9/1970 | Vaccaro | |
| D221,412 S | 8/1971 | Laughlin | |
| 3,886,508 A | 5/1975 | Lavrad | |
| 3,887,103 A | 6/1975 | Spooner | |
| 3,933,286 A | 1/1976 | Karkas | |
| D238,821 S | 2/1976 | Romani | |
| 3,943,912 A | 3/1976 | Nakayama | |
| D240,901 S | 8/1976 | Unger | |
| 3,997,092 A | 12/1976 | Pogwizd | |
| 4,023,304 A | 5/1977 | Singer | |
| 4,068,784 A | 1/1978 | Angell | |
| 4,069,954 A | 1/1978 | Rauch | |
| 4,103,779 A | 8/1978 | Wagner | |
| D249,939 S | 10/1978 | Dammons | |
| D252,479 S | 7/1979 | Goeden | |
| D252,541 S | 8/1979 | Harper | |
| 4,182,470 A | 1/1980 | Atkinson | |
| D256,512 S | 8/1980 | Sims | |
| 4,317,284 A | 3/1982 | Prindle | |
| D267,555 S | 1/1983 | Cox | |
| 4,389,775 A | 6/1983 | Collins | |
| D271,911 S | 12/1983 | Hunt | |
| 4,432,477 A | 2/1984 | Haidt et al. | |
| 4,480,596 A | 11/1984 | Shumiyashu | |
| 4,481,712 A | 11/1984 | Phelps | |
| 4,498,612 A | 2/1985 | Geekie | |
| 4,544,076 A | 10/1985 | Miller | |
| 4,561,525 A * | 12/1985 | Shidner | A45C 3/00 190/106 |
| 4,587,956 A | 5/1986 | Griffin et al. | |
| D288,076 S | 2/1987 | Wheeler | |
| 4,662,070 A | 5/1987 | Reddig | |
| 4,715,839 A | 12/1987 | Ford | |
| 4,754,528 A | 7/1988 | Lyons et al. | |
| 4,826,059 A | 5/1989 | Bosch et al. | |
| 4,858,800 A | 8/1989 | Holtzclaw, Jr. et al. | |
| 4,917,644 A | 4/1990 | Sunshine | |
| 4,941,260 A | 7/1990 | Castelluzzo | |
| 4,942,663 A | 7/1990 | Ray, Sr. | |
| 5,018,653 A | 5/1991 | Shoemaker | |
| D317,402 S | 6/1991 | Segal | |
| D317,730 S | 6/1991 | Mo | |
| 5,025,966 A | 6/1991 | Potter | |
| D327,562 S | 6/1992 | Brightbill | |
| D329,135 S | 9/1992 | Embree | |
| 5,163,566 A | 11/1992 | Hempel | |
| 5,199,621 A | 4/1993 | McLennan | |
| 5,213,240 A | 5/1993 | Dietz et al. | |
| 5,217,150 A | 6/1993 | Chen | |
| 5,236,113 A | 8/1993 | Wisser | |
| D343,166 S | 1/1994 | Nanji | |
| 5,301,428 A | 4/1994 | Wilcox | |
| 5,333,767 A | 8/1994 | Anderson | |
| 5,341,975 A | 8/1994 | Marinescu | |
| D354,667 S | 1/1995 | Rundell | |
| 5,385,281 A | 1/1995 | Byrd | |
| 5,388,740 A | 2/1995 | Garland | |
| D357,119 S | 4/1995 | Calmeise et al. | |
| D364,955 S | 12/1995 | Gringer et al. | |
| 5,484,057 A | 1/1996 | Tzu-Ching | |
| 5,513,405 A | 5/1996 | Bradbury | |
| D372,878 S | 8/1996 | Finnegan | |
| 5,584,423 A | 12/1996 | Wang | |
| 5,592,742 A | 1/1997 | Okamura | |
| 5,593,073 A | 1/1997 | Finnegan | |
| 5,623,735 A | 4/1997 | Perry | |
| 5,630,242 A | 5/1997 | Oginaezawa | |
| 5,632,426 A | 5/1997 | Beletsky et al. | |
| 5,642,847 A | 7/1997 | Demeo et al. | |
| D386,381 S | 11/1997 | Black | |
| D386,616 S | 11/1997 | Nimer | |
| 5,707,333 A | 1/1998 | Bakst | |
| 5,758,807 A | 6/1998 | Wright | |
| 5,782,743 A | 7/1998 | Russell | |
| 5,820,000 A | 10/1998 | Timberlake et al. | |
| 5,894,971 A | 4/1999 | Huang | |
| 5,950,239 A | 9/1999 | Lopez | |
| 5,984,046 A | 11/1999 | Urso, Jr. | |
| 5,989,101 A | 11/1999 | Jenn-Shyang et al. | |
| 6,006,365 A | 12/1999 | Strandberg | |
| 6,006,906 A | 12/1999 | Winnard | |
| 6,049,914 A | 4/2000 | Heilman | |
| D426,640 S | 6/2000 | Bell et al. | |
| 6,093,143 A | 7/2000 | Nagler | |
| D432,412 S | 10/2000 | Gamboa | |
| 6,125,475 A | 10/2000 | Taylor | |
| 6,195,898 B1 | 3/2001 | Lemisch | |
| 6,205,667 B1 | 3/2001 | Glesser | |
| 6,213,268 B1 * | 4/2001 | Dancyger | A45C 13/02 190/110 |
| 6,219,869 B1 | 4/2001 | Burba | |
| 6,267,277 B1 | 7/2001 | Taylor | |
| D447,632 S | 9/2001 | Gisser | |
| 6,325,577 B1 | 12/2001 | Anderson | |
| 6,330,961 B1 | 12/2001 | Borja | |
| 6,332,862 B1 | 12/2001 | Zandman | |
| 6,336,555 B1 | 1/2002 | Breeden | |
| 6,382,482 B1 | 5/2002 | Chao | |
| 6,401,253 B2 | 6/2002 | Brunson | |
| 6,405,381 B1 | 6/2002 | Bowman | |
| 6,406,418 B1 | 6/2002 | Getek | |
| 6,457,239 B1 | 10/2002 | McLaughlin | |
| 6,457,252 B1 | 10/2002 | Kershner | |
| 6,481,017 B2 | 11/2002 | Mullis | |
| 6,530,508 B1 | 3/2003 | Devine | |
| 6,561,402 B2 | 5/2003 | Holland et al. | |
| 6,571,997 B2 | 6/2003 | Dedrick | |
| 6,587,022 B1 | 7/2003 | Devine | |
| 6,610,023 B2 | 8/2003 | Steponovich | |
| 6,612,434 B1 | 9/2003 | Redzisz | |
| 6,643,845 B2 | 11/2003 | O'Dea et al. | |
| 6,655,565 B2 | 12/2003 | Godshaw | |
| 6,658,756 B1 | 12/2003 | Sanchez, Jr. | |
| 6,675,965 B2 | 1/2004 | Holland | |
| 6,719,178 B1 | 4/2004 | Taylor | |
| 6,779,199 B1 | 8/2004 | O'Dea et al. | |
| D495,939 S | 9/2004 | Ping | |
| 6,796,344 B2 | 9/2004 | Chen et al. | |
| 6,824,028 B2 | 11/2004 | Mutai et al. | |
| 6,836,899 B1 | 1/2005 | Glasmire | |
| 6,888,940 B1 | 5/2005 | Deppen | |
| 6,925,656 B2 | 8/2005 | Henderson | |
| D509,724 S | 9/2005 | Cook | |
| 6,964,361 B2 | 11/2005 | Kathrein | |
| 7,000,732 B1 | 2/2006 | Briggs Jr. | |
| 7,003,833 B2 | 2/2006 | Feliciano | |
| 7,048,162 B2 | 5/2006 | Frye et al. | |
| 7,076,885 B2 | 7/2006 | Potter | |
| D526,484 S | 8/2006 | Flint | |
| 7,011,402 B2 | 9/2006 | Pearman | |
| D530,088 S | 10/2006 | Kokawa | |
| 7,124,921 B1 | 10/2006 | Hubbell | |
| 7,146,651 B1 | 12/2006 | Lapin | |
| D541,531 S | 5/2007 | Leao | |
| D551,551 S | 9/2007 | Woolery | |
| 7,325,681 B2 | 2/2008 | Schonenbach | |
| 7,373,696 B2 | 5/2008 | Schoening et al. | |
| D581,240 S | 11/2008 | Glesser | |
| 7,490,724 B2 | 2/2009 | Week et al. | |
| D602,688 S | 10/2009 | Smith | |
| 7,604,103 B2 * | 10/2009 | Hamlin | A45C 7/0022 150/112 |
| D611,678 S | 3/2010 | Bailer | |
| 7,810,998 B2 | 10/2010 | Williams | |
| 7,934,610 B2 | 5/2011 | Zeng | |
| D639,092 S | 6/2011 | Lundy | |
| D641,552 S | 7/2011 | Sosnovsky | |
| 8,006,391 B1 | 8/2011 | Mashburn | |
| D647,301 S | 10/2011 | Sosnovsky | |
| D648,533 S | 11/2011 | Sosnovsky | |
| D649,786 S | 12/2011 | Lipfert et al. | |
| D663,115 S | 7/2012 | Hansen | |
| 8,317,067 B2 | 11/2012 | Lewis | |
| 8,403,140 B2 | 3/2013 | Woolery | |

(56) References Cited

U.S. PATENT DOCUMENTS

| | | | |
|---|---|---|---|
| 8,418,971 | B2 | 4/2013 | Rayko |
| 8,499,986 | B2 | 8/2013 | Knight et al. |
| 8,516,621 | B2 | 8/2013 | Woolery |
| D693,595 | S | 11/2013 | Pierre-Pipkin |
| 8,636,169 | B2 | 1/2014 | Sampaio |
| 8,673,124 | B2 | 3/2014 | Endo et al. |
| D703,438 | S | 4/2014 | Lee |
| D704,935 | S | 5/2014 | Lintz et al. |
| 8,726,525 | B2 | 5/2014 | Bagley |
| D721,496 | S | 1/2015 | Hofem |
| 8,931,179 | B2 | 1/2015 | Powell |
| 8,936,222 | B1 | 1/2015 | Bastien |
| D725,910 | S | 4/2015 | Sampaio |
| 9,041,338 | B2 | 5/2015 | Shen |
| 9,131,756 | B2 | 9/2015 | Hurst et al. |
| 9,216,503 | B2 | 12/2015 | Lawrence |
| 9,252,612 | B2 | 2/2016 | Balhua |
| 9,379,759 | B2 | 6/2016 | Platt |
| D778,714 | S | 2/2017 | McSweyn et al. |
| D783,287 | S | 4/2017 | Swartzel |
| D783,371 | S | 4/2017 | Burton et al. |
| 9,616,821 | B2 | 4/2017 | Elharar |
| D789,690 | S | 6/2017 | Foley et al. |
| 9,801,444 | B2 | 10/2017 | Watson |
| 9,818,513 | B2 | 11/2017 | Takagi |
| D825,921 | S | 8/2018 | Pennington |
| 10,070,707 | B2 | 9/2018 | Whitten et al. |
| 10,173,334 | B2 | 1/2019 | Woolery |
| 10,547,036 | B1 | 1/2020 | Ashley |
| 2001/0054630 | A1 | 12/2001 | Crabill |
| 2002/0104151 | A1 | 8/2002 | Rauscher |
| 2002/0113105 | A1 | 8/2002 | Jarman |
| 2002/0175100 | A1 | 11/2002 | Holland et al. |
| 2002/0175131 | A1 | 11/2002 | Johnson |
| 2003/0052143 | A1 | 3/2003 | Devine |
| 2003/0197042 | A1 | 10/2003 | Warren |
| 2003/0230606 | A1 | 12/2003 | Devine |
| 2004/0173484 | A1 | 9/2004 | Bates et al. |
| 2004/0178236 | A1 | 9/2004 | Kakouras |
| 2005/0029066 | A1 | 2/2005 | Redzisz |
| 2005/0035164 | A1 | 2/2005 | Badillo |
| 2005/0040194 | A1 | 2/2005 | Frye et al. |
| 2005/0082323 | A1 | 4/2005 | O'Hair |
| 2005/0102845 | A1 | 5/2005 | Dallas |
| 2005/0132578 | A1 | 6/2005 | Colich |
| 2005/0140331 | A1 | 6/2005 | McQuade |
| 2005/0167306 | A1* | 8/2005 | Ho ........................ B25H 3/023 206/349 |
| 2005/0263550 | A1 | 12/2005 | Williams |
| 2006/0011679 | A1 | 1/2006 | Santiago |
| 2006/0016841 | A1 | 1/2006 | Shurm |
| 2006/0027613 | A1 | 2/2006 | Chang |
| 2006/0032876 | A1 | 2/2006 | Goffinet |
| 2006/0070901 | A1 | 4/2006 | Adams et al. |
| 2006/0102678 | A1 | 5/2006 | Bommarito |
| 2006/0207102 | A1 | 9/2006 | Bezold |
| 2006/0218810 | A1 | 10/2006 | Holevas |
| 2006/0261113 | A1 | 11/2006 | Godshaw et al. |
| 2006/0272076 | A1 | 12/2006 | Schroeder |
| 2007/0006367 | A1 | 1/2007 | Newman et al. |
| 2007/0017828 | A1 | 1/2007 | Cuomo |
| 2007/0099469 | A1 | 5/2007 | Sorensen |
| 2007/0180726 | A1 | 8/2007 | Harrell |
| 2007/0181394 | A1* | 8/2007 | Dancyger ................ A45C 5/06 206/349 |
| 2007/0199426 | A1 | 8/2007 | Tafolla |
| 2007/0261174 | A1 | 11/2007 | Barker |
| 2008/0016699 | A1 | 1/2008 | Chang |
| 2008/0060204 | A1 | 3/2008 | Chen |
| 2008/0185414 | A1 | 8/2008 | Conlon |
| 2008/0230416 | A1 | 9/2008 | Brouard |
| 2008/0283563 | A1 | 11/2008 | O'Donnell et al. |
| 2009/0044419 | A1 | 2/2009 | Lee et al. |
| 2009/0050657 | A1 | 2/2009 | Woolery |
| 2009/0094801 | A1 | 4/2009 | Woolery |
| 2009/0095785 | A1 | 4/2009 | Woolery |
| 2009/0127146 | A1 | 5/2009 | Krebs et al. |
| 2009/0140016 | A1 | 6/2009 | Case et al. |
| 2009/0194571 | A1 | 8/2009 | Evans |
| 2009/0289090 | A1 | 11/2009 | Fullerton et al. |
| 2009/0314813 | A1 | 12/2009 | Woolery |
| 2010/0193557 | A1 | 8/2010 | Clinton et al. |
| 2010/0293791 | A1 | 11/2010 | Mueller |
| 2011/0005944 | A1 | 1/2011 | Woolery |
| 2011/0083254 | A1 | 4/2011 | Trutuna et al. |
| 2012/0017442 | A1 | 1/2012 | King |
| 2012/0042520 | A1 | 2/2012 | Simeray |
| 2013/0047455 | A1 | 2/2013 | Steele et al. |
| 2013/0126541 | A1 | 5/2013 | Woolery |
| 2013/0167381 | A1 | 7/2013 | Kommer |
| 2013/0200117 | A1 | 8/2013 | Monro et al. |
| 2014/0173914 | A1 | 6/2014 | Yu Chen |
| 2014/0325847 | A1 | 11/2014 | Woolery |
| 2014/0338197 | A1 | 11/2014 | Frazer |
| 2015/0027833 | A1 | 1/2015 | Taylor et al. |
| 2015/0245726 | A1 | 9/2015 | Henry |
| 2015/0326044 | A1 | 11/2015 | Ashley |
| 2017/0318697 | A1 | 11/2017 | Lebovitz |
| 2018/0279733 | A1 | 10/2018 | Young et al. |
| 2019/0091884 | A1 | 3/2019 | Woolery |
| 2021/0100340 | A1 | 4/2021 | Chang |

FOREIGN PATENT DOCUMENTS

| | | | |
|---|---|---|---|
| FR | 2774619 | A1 | 8/1999 |
| FR | 2914872 | A1 | 10/2008 |

OTHER PUBLICATIONS www.dickblick.com BLICK art materials, "Q-Grip Canvas Grip Brush Organizer", 2 pages.
www.dickblick.com BLICK art materials, "Lowe Cornell Brush Organizer", 2 pages.
www.dickblick.com BLICK art materials, "Prat Start Brush Ease", 1 page.
www.dickblick.com BLICK art materials, "Canvas Brush Organizer", 2 pages.
www.dickblick.com BLICK art materials, "Blick Hanging Closet Organizer", 2 pages.
http://www.artmakers.com/magneto.
http://www.buildingonline.com/news.
http://www.smarthome.com/89091.
http://www.diynetwork.com/diy.
Lee Valley & veritas, Fine Woodworking Tools 2001/2002, Magnetic Tape Holder.
Home Depot, "Huskey 14 in. Large Mouth Tool Bag", First on sale Sep. 20, 2011, (https://www.homedepot.com/p/Husky-144-in-Large-Mouth-Tool-Bag-71787-2N09/202018007?Merch-Rec_PIPHorizontal2_rr_205973624-202018007-N)(Year-2011).
Translation of CN-201986921U, Yichuan Zhang, Sep. 28, 2011.

* cited by examiner

TOOL HOLDING SYSTEM, METHOD AND DEVICE WITH COVER SHEET

FIELD OF THE INVENTION

The present invention is generally directed to tool holding systems and devices. More particularly, the present invention is directed to a tool holding system and device with a primary and secondary storage compartment and a rain cover.

BACKGROUND OF THE INVENTION

Tools including, tape measures, levels, pliers, screw drivers, wrenches, hammers, power tools and others are an integral part of the professional and amateur tool kit. In particular, many projects require multiple tools to be used interchangeably throughout the course of the project. These projects may also require multiple parts and/or fasteners for completion of the project.

SUMMARY OF THE INVENTION

A tool holding system and device comprises a tool holder comprising a cover pouch, a cover sheet, a primary storage compartment for removably holding one or more tools and a secondary storage compartment configured to removably receive a parts bin. The parts bin is configured to removably hold one or more additional tools.

A first aspect is directed to a tool holding system. The system comprises a tool bag having a handle and a body comprising a primary storage compartment formed by a primary floor, a plurality of perimeter walls extending up from the primary floor and a top opening opposite the primary floor, a secondary storage compartment formed by a secondary floor, a subset of the plurality of perimeter walls extending down from the primary floor to the secondary floor and a side opening opposite one of the subset of the plurality of perimeter walls, a cover pouch having an inner cavity and a bottom opening, the cover pouch extending from an outer surface of one of the plurality of perimeter walls and a cover sheet coupled to the cover pouch via a flexible coupling band and a parts bin configured to fit within the side opening and removably hold one or more tools.

In some embodiments, the cover sheet is able to crumple to fit within the cover pouch and to spread out to surround all of the tool bag except for a bottom of the tool bag below the secondary floor. In some embodiments, the cover pouch has a fastening mechanism and a cutout aperture, the fastening mechanism configured to seal the bottom opening except for the cutout aperture when fully closed. In some embodiments, the flexible coupling band extends through the cutout aperture when the fastening mechanism is fully sealed and the cover sheet is positioned outside the inner cavity. In some embodiments, the cover pouch has a second cutout aperture opposite the cutout aperture, the cover sheet has a second flexible coupling band, and the second flexible coupling band extends through the second cutout aperture when the fastening mechanism is fully sealed and the cover sheet is positioned outside the inner cavity. In some embodiments, the subset of the plurality of perimeter walls extend a greater distance up from the primary floor to the top opening than down from the primary floor to the secondary floor. In some embodiments, the cover pouch is positioned on the body opposite the side opening. In some embodiments, the handle rotatably couples between two of the plurality of perimeter walls. In some embodiments, a perimeter edge of the cover sheet has a maximum perimeter extension and includes a cinching mechanism that is able to bias the perimeter edge inwards from the maximum perimeter extension.

A second aspect is directed to a tool bag for holding tools. The tool bag comprises a handle and a body comprising a primary storage compartment formed by a primary floor, a plurality of perimeter walls extending up from the primary floor and a top opening opposite the primary floor, a secondary storage compartment formed by a secondary floor, a subset of the plurality of perimeter walls extending down from the primary floor to the secondary floor and a side opening opposite one of the subset of the plurality of perimeter walls, a cover pouch having an inner cavity and a bottom opening, the cover pouch extending from an outer surface of one of the plurality of perimeter walls and a cover sheet coupled to the cover pouch via a flexible coupling band.

In some embodiments, the cover sheet is able to crumple to fit within the cover pouch and to spread out to surround all of the tool bag except for a bottom of the tool bag below the secondary floor. In some embodiments, the cover pouch has a fastening mechanism and a cutout aperture, the fastening mechanism configured to seal the bottom opening except for the cutout aperture when fully closed. In some embodiments, the flexible coupling band extends through the cutout aperture when the fastening mechanism is fully sealed and the cover sheet is positioned outside the inner cavity. In some embodiments, the cover pouch has a second cutout aperture opposite the cutout aperture, the cover sheet has a second flexible coupling band, and the second flexible coupling band extends through the second cutout aperture when the fastening mechanism is fully sealed and the cover sheet is positioned outside the inner cavity. In some embodiments, the subset of the plurality of perimeter walls extend a greater distance up from the primary floor to the top opening than down from the primary floor to the secondary floor. In some embodiments, the cover pouch is positioned on the body opposite the side opening. In some embodiments, the handle rotatably couples between two of the plurality of perimeter walls. In some embodiments, a perimeter edge of the cover sheet has a maximum perimeter extension and includes a cinching mechanism that is able to bias the perimeter edge inwards from the maximum perimeter extension.

A third aspect is directed to a method of using a tool holding system. The method comprises taking a cover sheet out of an inner cavity of a cover pouch of a tool bag, the tool bag having a handle and a body comprising a primary storage compartment formed by a primary floor, a plurality of perimeter walls extending up from the primary floor and a top opening opposite the primary floor, a secondary storage compartment formed by a secondary floor, a subset of the plurality of perimeter walls extending down from the primary floor to the secondary floor and a side opening opposite one of the subset of the plurality of perimeter walls, the cover pouch having the inner cavity and a bottom opening, the cover pouch extending from an outer surface of one of the plurality of perimeter walls and the cover sheet coupled to the cover pouch via a flexible coupling band and pulling the cover sheet over the tool bag such that the cover sheet covers the tool bag.

In some embodiments, the cover sheet is able to crumple to fit within the cover pouch and to spread out to surround all of the tool bag except for a bottom of the tool bag below the secondary floor. In some embodiments, the cover pouch has a fastening mechanism and a cutout aperture, the fastening mechanism configured to seal the bottom opening except for the cutout aperture when fully closed. In some embodiments, taking the cover sheet out of the inner cavity includes positioning the flexible coupling band through the cutout aperture and fully sealing the fastening mechanism. In some embodiments, the cover pouch has a second cutout aperture opposite the cutout aperture, the cover sheet has a second flexible coupling band, and the second flexible coupling band extends through the second cutout aperture when the fastening mechanism is fully sealed and the cover sheet is positioned outside the inner cavity. In some embodiments, the subset of the plurality of perimeter walls extend a greater distance up from the primary floor to the top opening than down from the primary floor to the secondary floor. In some embodiments, the cover pouch is positioned on the body opposite the side opening. In some embodiments, the handle rotatably couples between two of the plurality of perimeter walls. In some embodiments, a perimeter edge of the cover sheet has a maximum perimeter extension and includes a cinching mechanism that is able to bias the perimeter edge inwards from the maximum perimeter extension.

BRIEF DESCRIPTIONS OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE PRESENT INVENTION

Figure 1A:
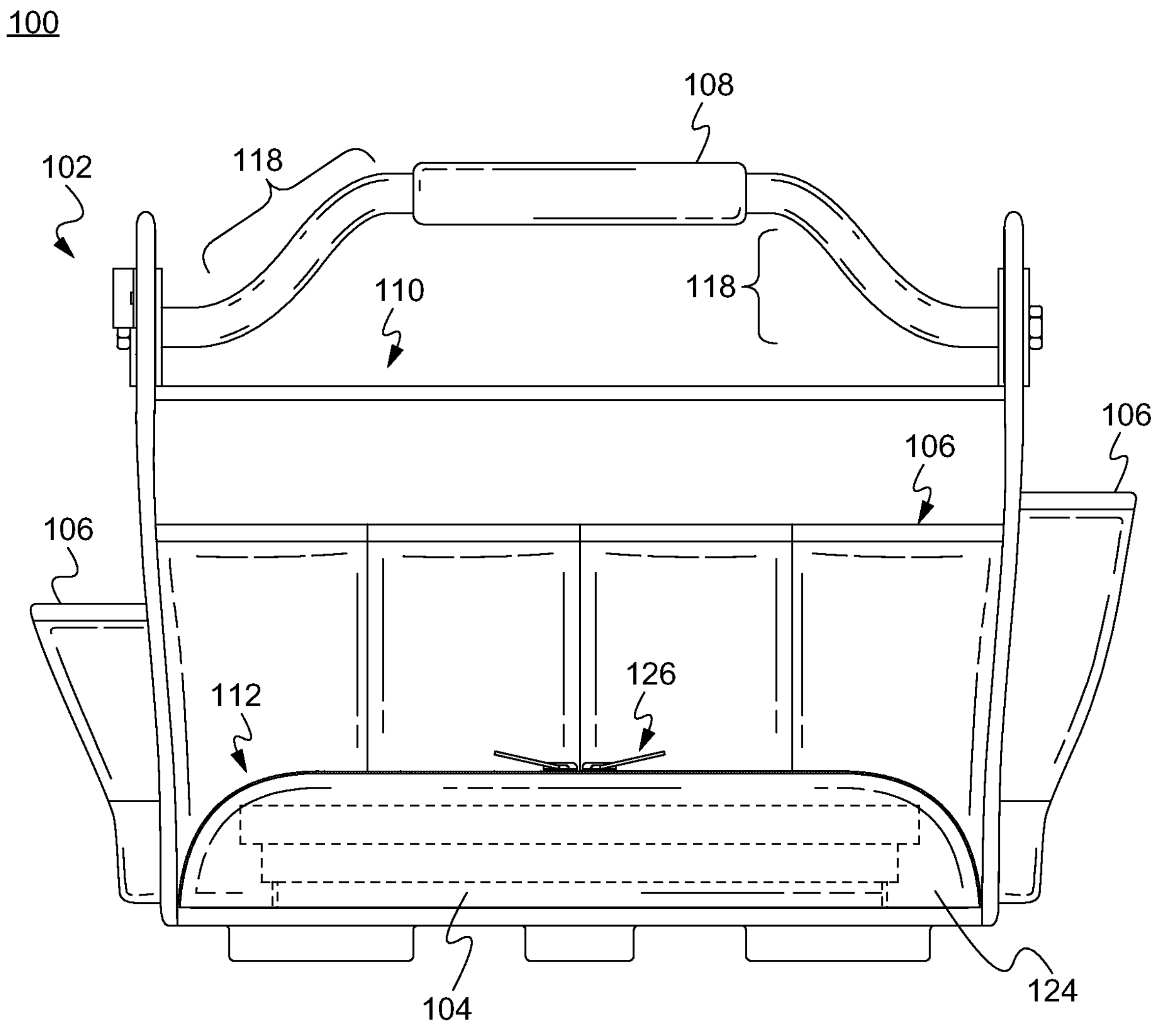
FIG. 1A illustrates a front view of a tool holder system according to some embodiments.
Figure 1B:
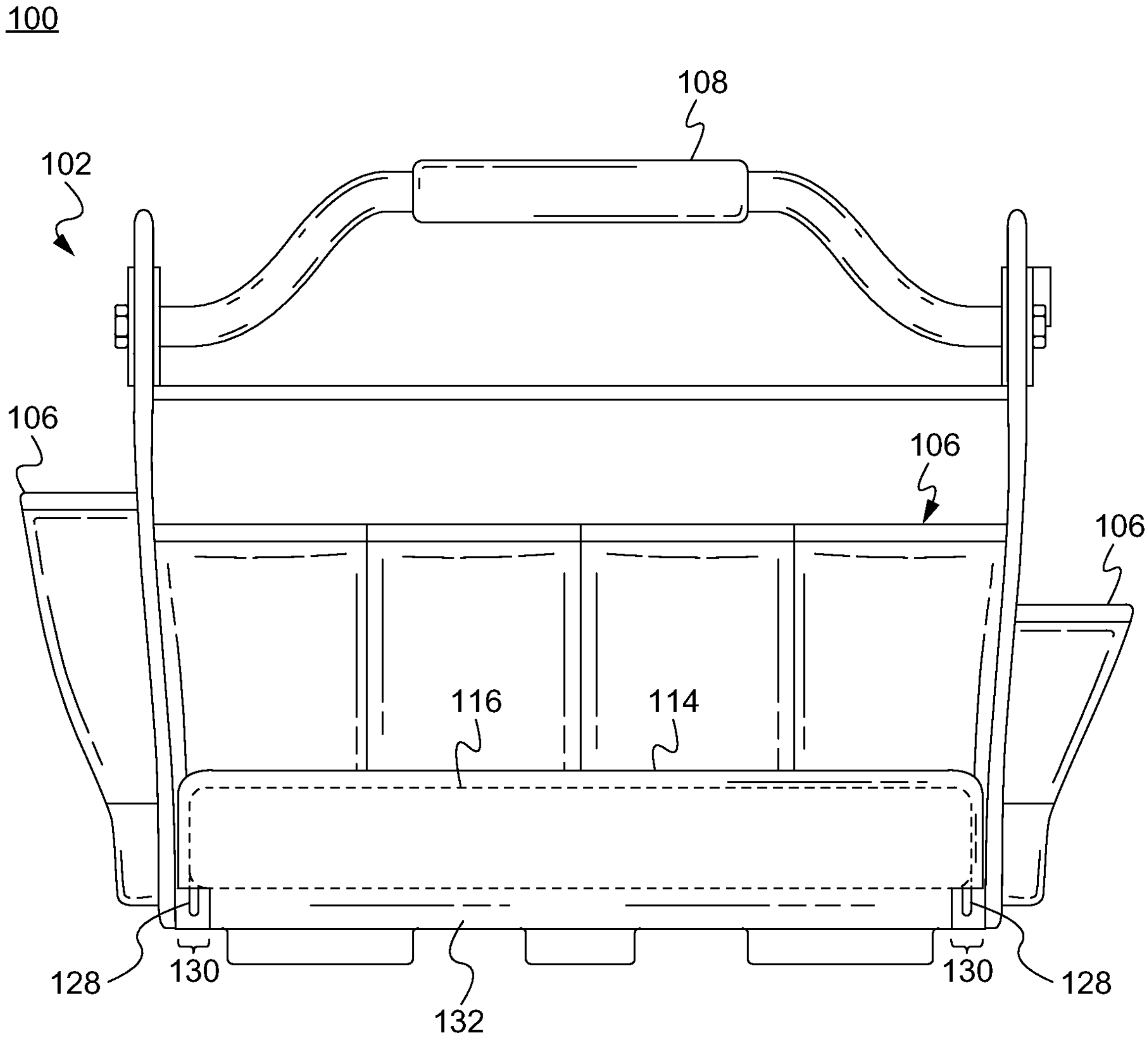
FIG. 1B illustrates a back view of the tool holder system according to some embodiments.
Figure 1C:
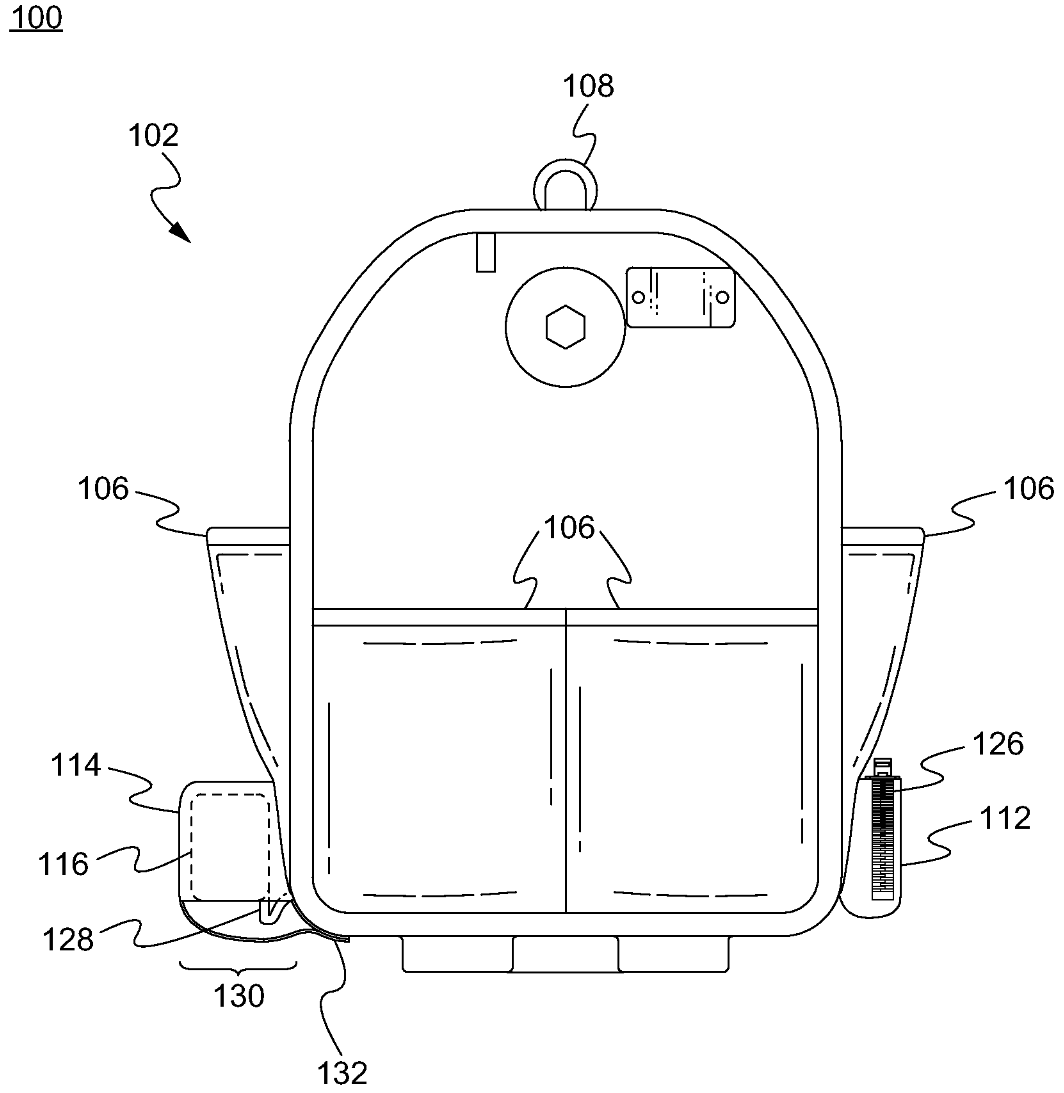
FIG. 1C illustrates a left view of the tool holder system according to some embodiments.
Figure 1D:
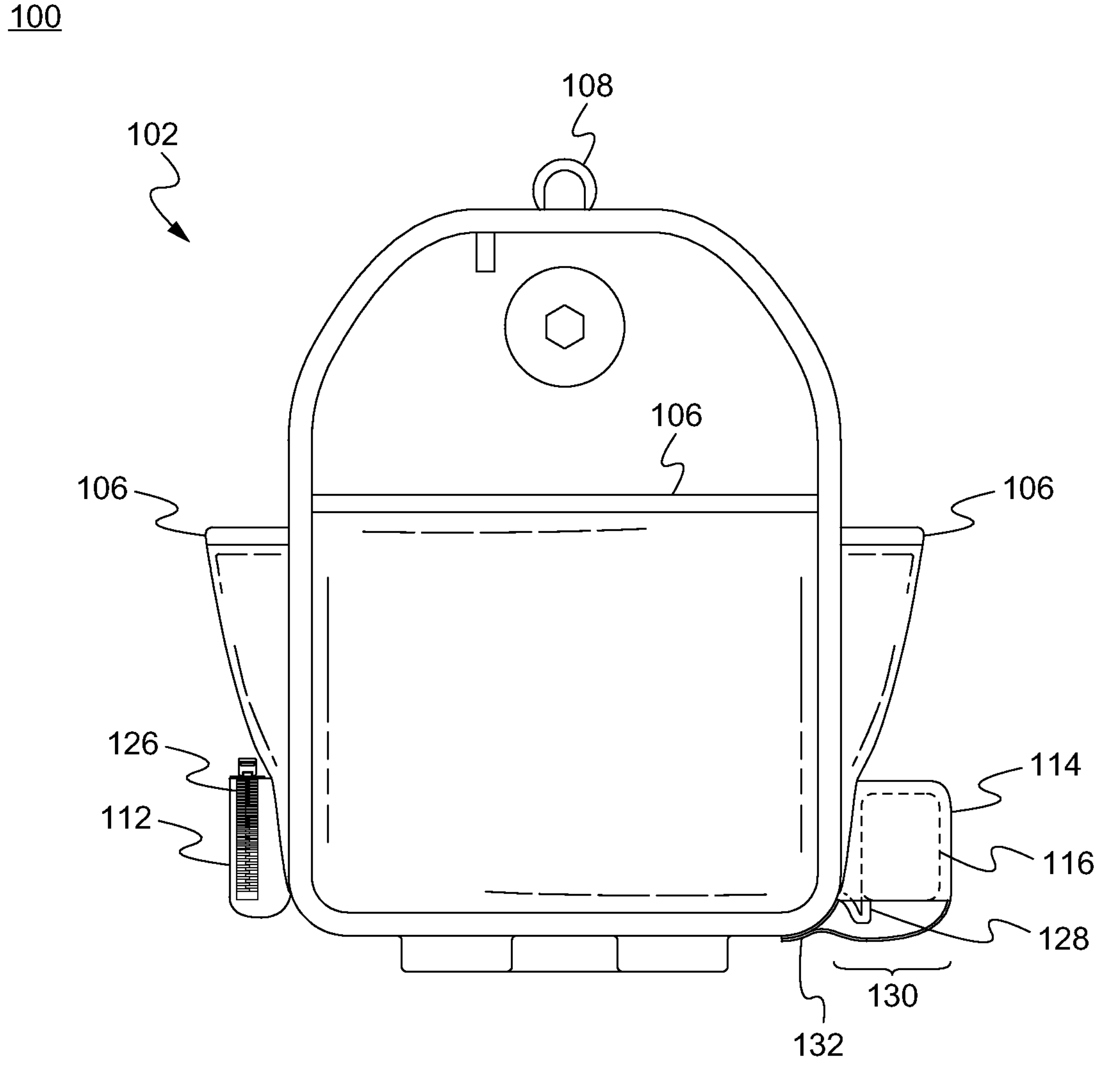
FIG. 1D illustrates a right view of the tool holder system according to some embodiments.

Embodiments of the invention are directed to tool holding system and device comprises a tool holder comprising a cover pouch, a cover sheet, a primary storage compartment for removably holding one or more tools and a secondary storage compartment configured to removably receive a parts bin. The parts bin is configured to removably hold one or more additional tools.

Reference will now be made in detail to implementations of a tool holding system and device as illustrated in the accompanying drawings. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIGS. 1A-1J illustrate front, back, left, right, top, bottom, front-right perspective, front with secondary compartment open, front with cover sheet extended (single band) and front with cover sheet extended (multi-band) views, respectively, of a tool holder system 100 according to some embodiments. As shown in FIGS. 1A-1J, the tool holding system 100 comprises a parts bin 104 having one or more cavities for holding parts (e.g. screws, nails, bits and/or other tools) and a tool bag 102. The tool bag 102 has one or more external flexible or rigid pockets 106, a rigid handle 108, a primary storage compartment 110, a secondary storage compartment 112, a flexible or rigid cover pouch 114 and a flexible/crumpleable cover sheet 116. The parts bin 104 is sized such that it fits entirely within the secondary storage compartment 112. Alternatively, one or more of the parts bin 104, external pockets 106, handle 108, primary storage compartment 110, secondary storage compartment 112, cover pouch 114 and cover sheet 116 are able to be omitted. Also, although as shown in FIGS. 1A-1J, the bag 102 has four pockets on the front, four pockets on the back, one pocket on the right and two pockets on the left, more or less pockets on one or more of the sides are contemplated. Additionally, a size and location of the pockets 106 on the exterior of the bag 102 is able to vary (e.g. instead of four pockets, two double size pockets are able to be used, and so forth). Further, in some embodiments the primary storage compartment 110 is able to include one or more internal pockets. In some embodiments, one or more of the pockets are able to be closed with a pocket fastener (e.g. a button, a zipper, velcro, magnet or other fastener) positioned long the opening of the pocket.

The handle 108 is able to comprise a pair of bends 118 and be rotatably coupled between the left and right sides of the bag 102. In some embodiments, the ends of the handle 108 are coupled through apertures in the sides of the bag 102 such that the handle is able to rotate within the apertures. Alternatively, the handle 108 is able to otherwise be rotatably coupled to the bag 102. In any case, when the handle 108 is rotated from center to the left or the right, the handle 108 no longer obstructs access to the primary storage compartment 110 due to the bends 118 causing the handle 108 move to the side as it rotates. At the same time, when carrying the bag 102 by the handle 108, the handle 108 will automatically rotate back into a centered position due to the bends 118, which enables the bag 102 to maintain stability when carried. Alternatively, the handle 108 is able to be straight and/or non-rotatably coupled to the bag 102.

Figure 1E:
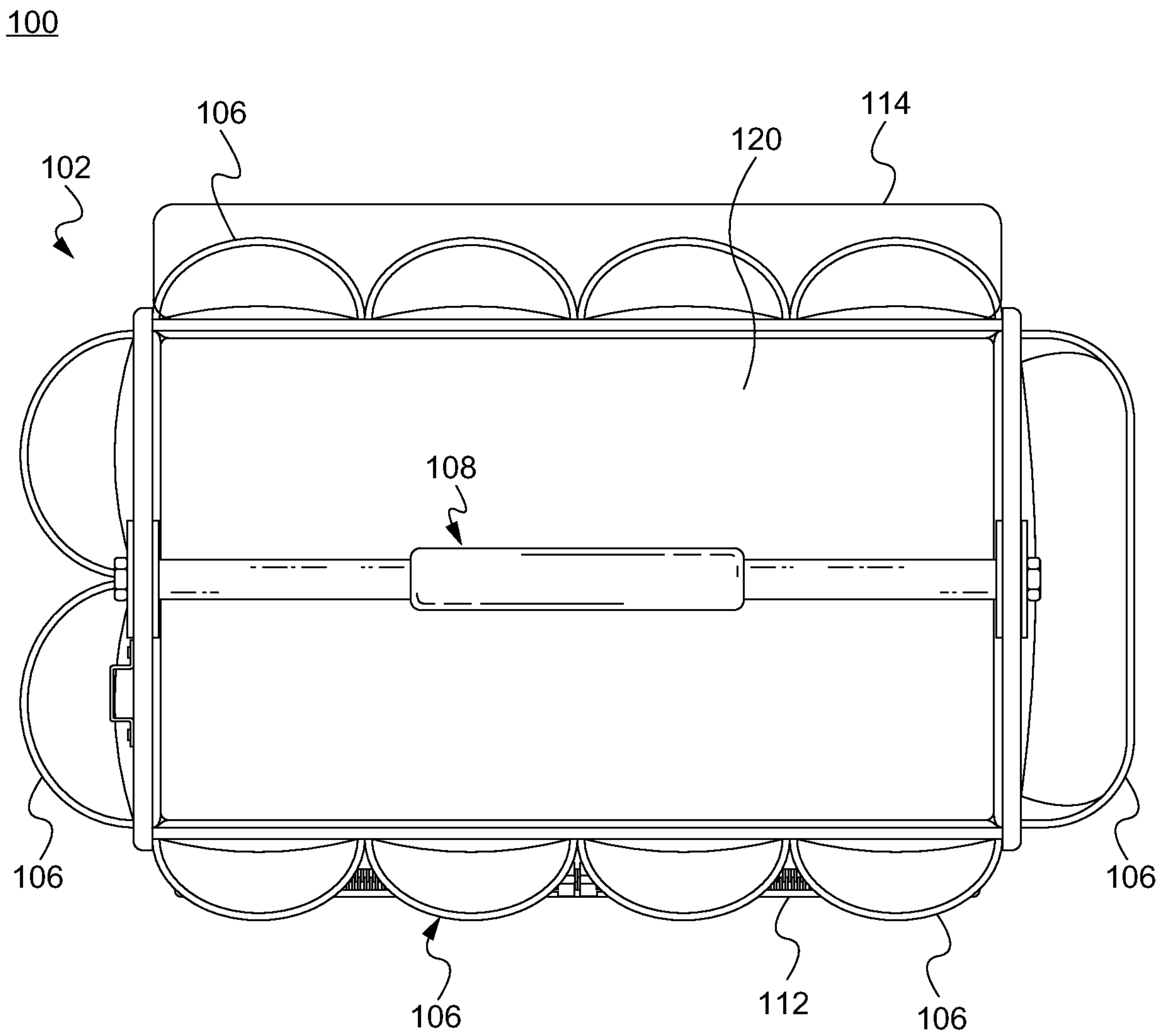
FIG. 1E illustrates a top view of the tool holder system according to some embodiments.
Figure 1F:
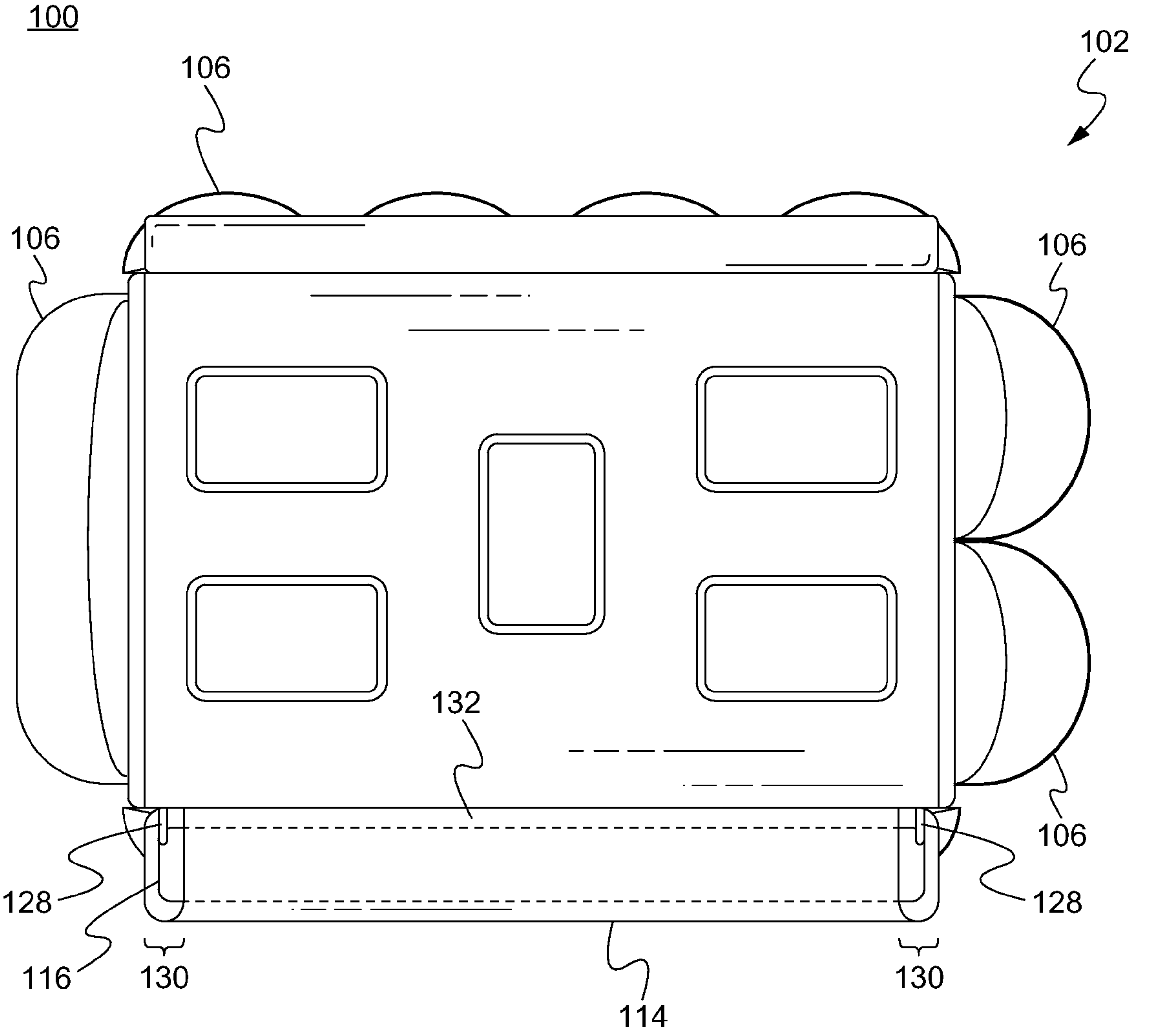
FIG. 1F illustrates a bottom view of the tool holder system according to some embodiments.

As shown in the top view of FIG. 1E, the primary storage compartment 110 is able to be accessed from a top opening 120 of the bag 102. Specifically, the primary storage compartment 110 is able to be formed by a plurality of rigid side walls extending vertically upward from a rigid primary floor, but with no ceiling. As a result, one or more tools are able to be placed within the primary storage compartment 110 through the top opening 120. Alternatively, in some embodiments the primary storage compartment 110 is able to comprise a lid and/or is accessed by opening the lid of the tool system. In some embodiments, two of the walls are able to be taller than the other walls in order to couple with the handle 108. In some embodiments, a distance between the walls forming the primary compartment 110 that are not coupled to the handle 108 (e.g. the distance between the shorter walls) is able to be sized such that those walls block the handle 108 from rotating into the primary compartment 110 (below those walls). As a result, when the handle 108 is rotated to either side, the center portion of the handle 108 is able to rest on those walls instead of dropping into (and partially blocking) the primary compartment 110. Alternatively, all of the walls are able to be the same height.

Figure 1G:
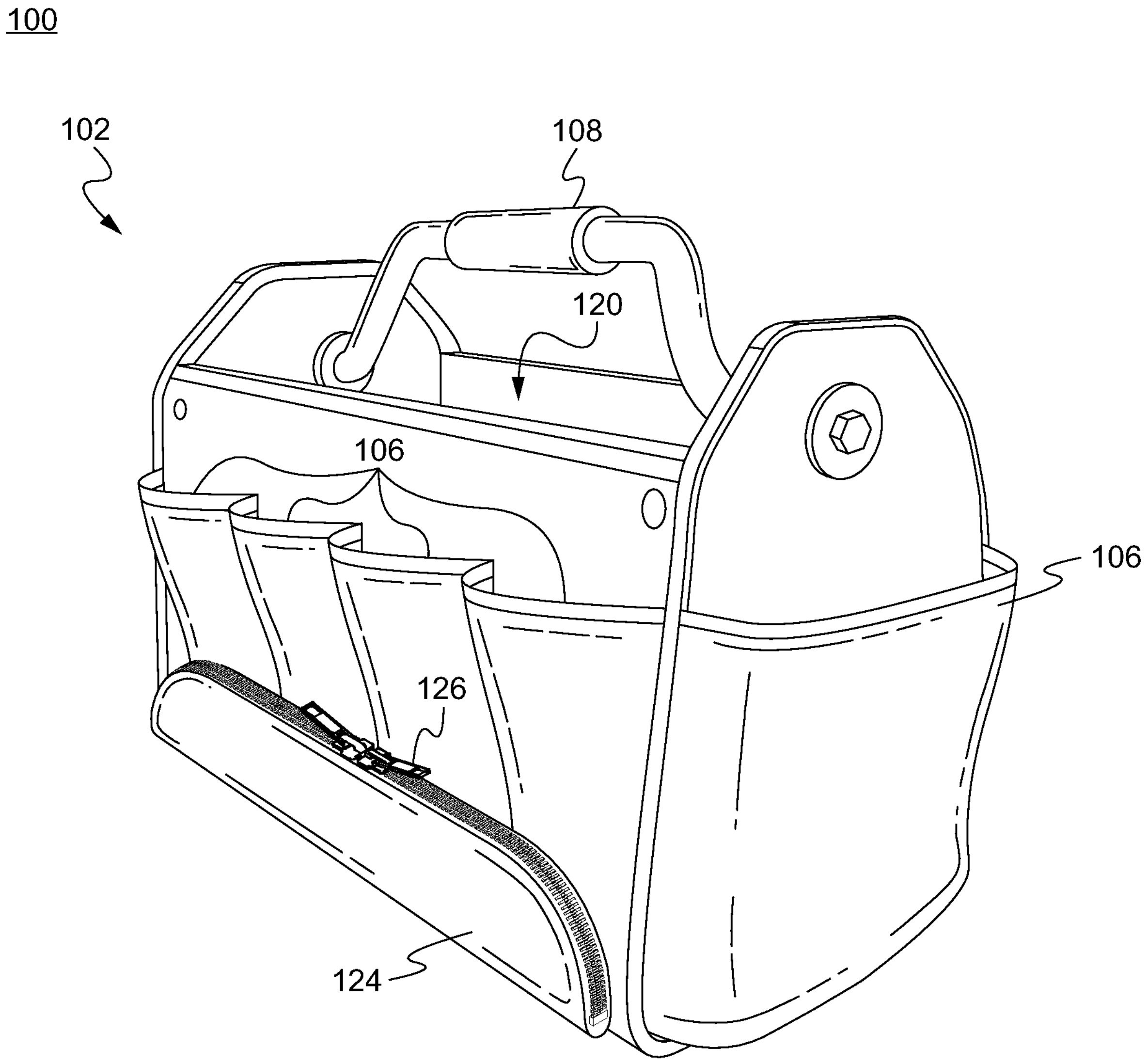
FIG. 1G illustrates a front-right perspective view of the tool holder system according to some embodiments.
Figure 1H:
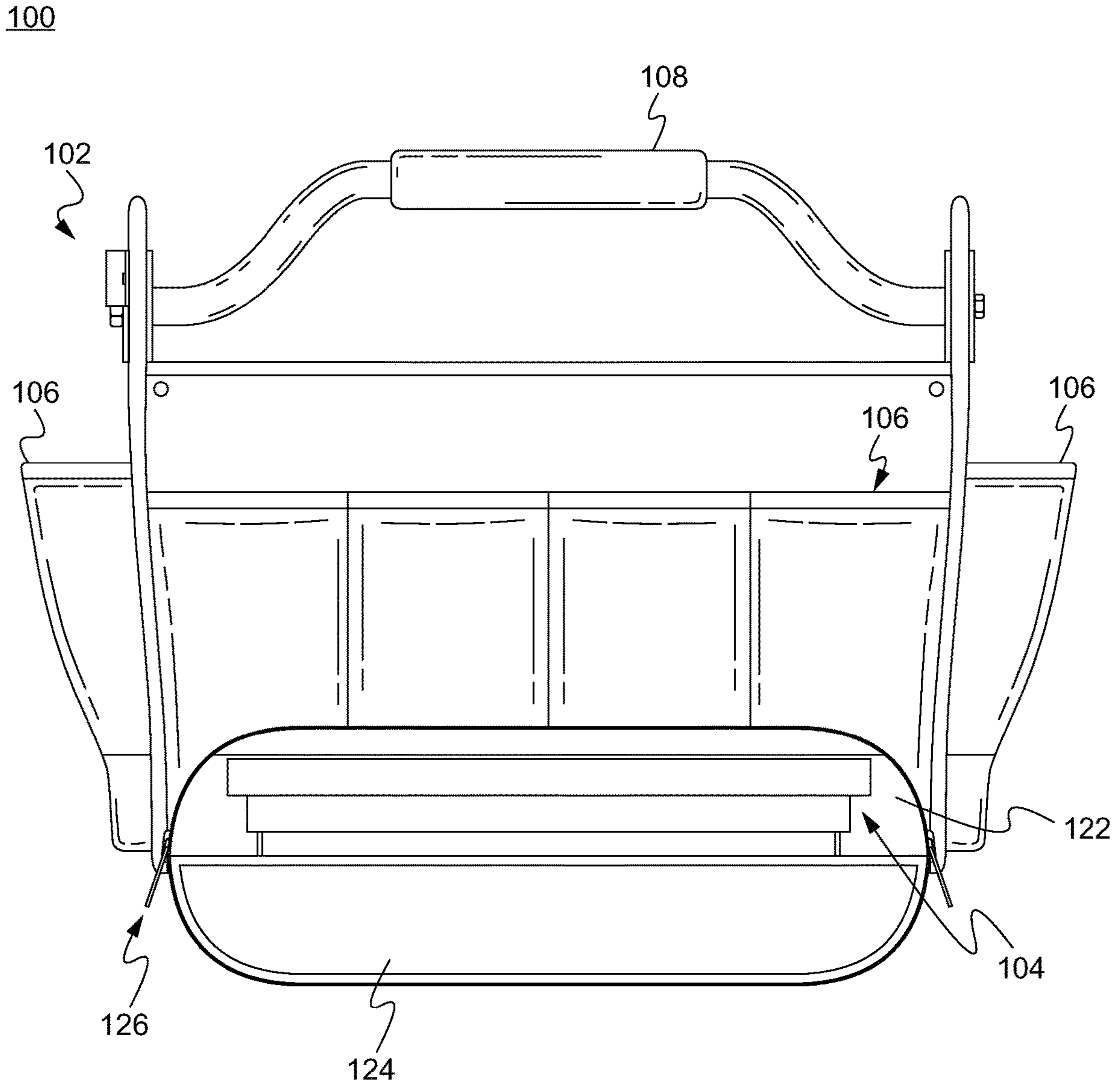
FIG. 1H illustrates a front view of the tool holder system with the secondary compartment flap open according to some embodiments.

As shown in FIGS. 1A, 1G and 1H, the secondary storage compartment 112 is able to be accessed from a front opening 122 of the bag 102. Specifically, the secondary storage compartment 112 is able to be formed by the primary floor (acting as a ceiling), a rigid secondary floor positioned below the primary floor, and the plurality of side walls extending vertically downward from the primary floor to a secondary floor (e.g. the bottom of the bag 102). One or more of the side walls are able to have an aperture creating the front opening 122 through which the secondary storage compartment 112 is able to be accessed. In some embodiments, the side wall(s) having the front opening 122 are able to include a flap fastener 126 and a flap 124. The flap 124 is able to be sized such that it that selectively covers the front opening 122 when the flap fastener 126 is closed and uncovers the front opening 122 when the flap fastener 126 is opened. Alternatively, the flap 124 and/or flap fastener 126 are able to be omitted. In some embodiments, the flap fastener 126 is a zipper. Alternatively, the flap fastener 126 is able to be one or a combination of one or more buttons, a zipper, a velcro system, a magnetic fastener or other types of fasteners. In some embodiments, the flap 124 comprises a ridged material which is folded down to access the secondary storage compartment 112. Alternatively, the flap 124 is able to comprise a flexible, stretchable or other appropriately desired material and/or configuration for covering the secondary storage compartment 112.

As shown in FIGS. 1B-D, 1F, 1I and 1J, the cover pouch 114 is able to extend from an outer side of the bag 102 (e.g. opposite the front opening 122) and form a pouch cavity that is accessible via a pouch opening at the bottom of the cover pouch 114. The pouch cavity is able to receive the cover sheet 116 via the pouch opening and is sized such that the cover sheet 116 is able to fit entirely within the pouch cavity. In some embodiments, the cover pouch 114 includes one or more pouch cutouts 130 and a pouch fastener 132 that selectively closes and opens the pouch opening. In some embodiments, the pouch fastener 132 is a zipper that zips the perimeter of the pouch opening (except for the cutouts 130) together to close the pouch 114. In some embodiments, the pouch fastener 132 is a velcro system with a hook portion positioned along the inside of the bottom of the pouch 114 (away from the bag body) and the loop portion positioned along the inside of the bottom of the pouch 114 (adjacent to the bag body), or vice versa. Alternatively, the pouch fastener 132 is able to be one or a combination of one or more buttons, a zipper, a velcro system, a magnetic fastener or other types of fasteners. In any case, the pouch fastener 132 is able to be positioned along the bottom edge of the cover pouch 114 (and/or the adjacent portion of the bag body) that forms the perimeter of the pouch opening. Specifically, the coupling parts of the pouch fastener 132 are able to be on opposite sides of that perimeter such that they are able to come together to couple to each other and thereby seal the pouch opening (except for the cutouts 130) and be spread apart to open the pouch opening/cover pouch 114.

The cover sheet 116 is able to be thin and/or flexible sheet sized such that it has a sheet opening leading to a sheet cavity that is able to cover at least the top and sides of the bag 102. In some embodiments, the edge or trim 134 of the cover sheet 116 that forms the perimeter of the sheet opening has biasing element that biases the sheet opening to be smaller that its maximum size. For example, the biasing element is able to be a spring (e.g. an elastic band) that is shorter than the trim 134 of the cover sheet 116 but is coupled to (e.g. hemmed into) the trim 134 of the cover sheet 116 such that it biases the trim 134 together to the spring's shorter length. As a result, when positioning the sheet 116 onto the bag 102, the biasing element is able to be stretched such that the sheet opening/trim fits over the top of the bag 102 and then released when the bag 102 is fully within the sheet cavity causing the trim 134 to tighten around the bottom of the bag 102 holding the sheet 116 onto the bag 102. Alternatively, the biasing element is able to be a cinching mechanism that is coupled to the edge/trim 134 of the sheet 116 and is able to be manually loosened or tightened in order to secure the cover sheet 116 around the bag 102.

Figure 1I:
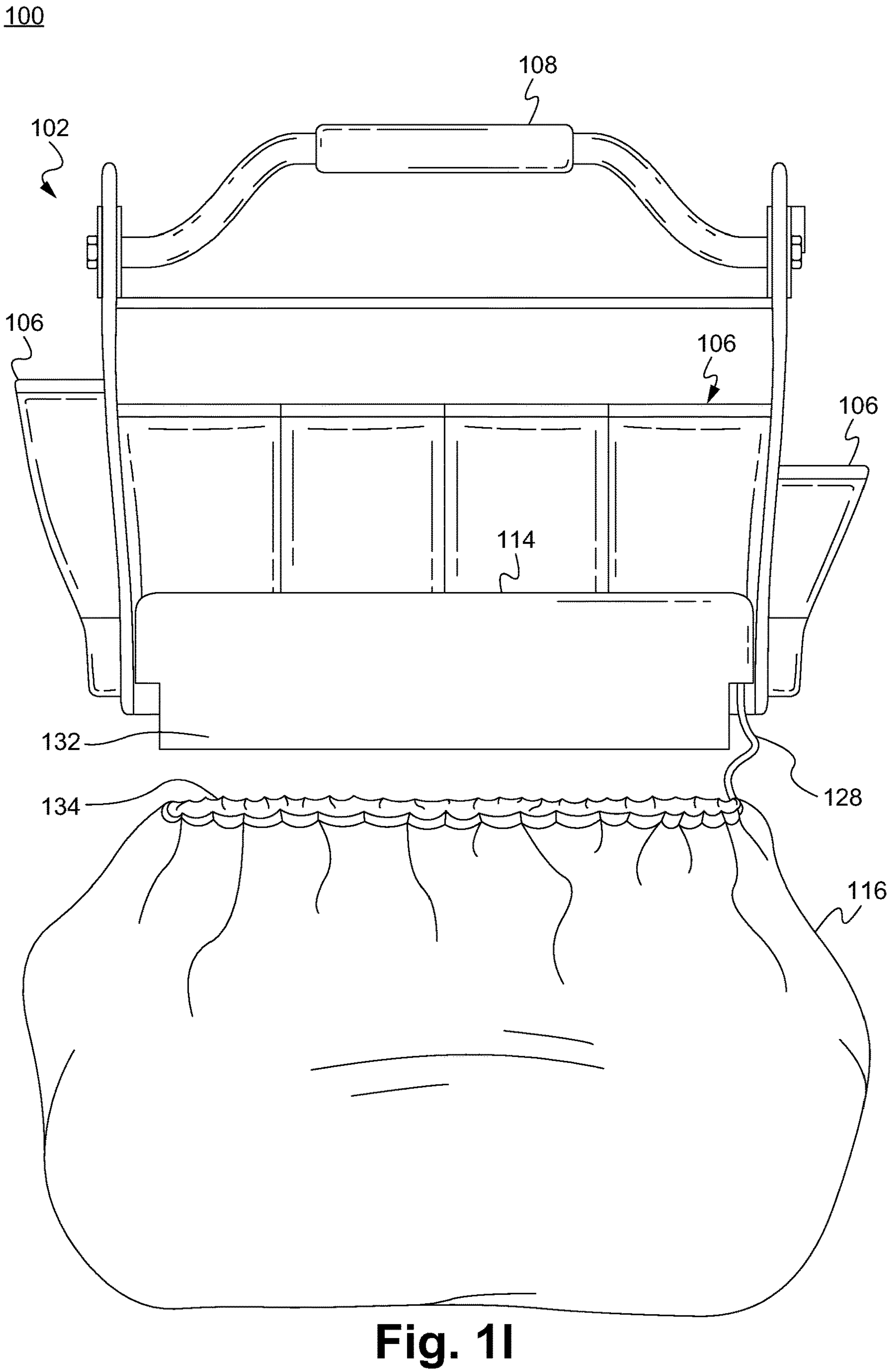
FIG. 1I illustrates a back view of the tool holder system with the cover sheet out coupled via a single coupling band according to some embodiments.
Figure 1J:
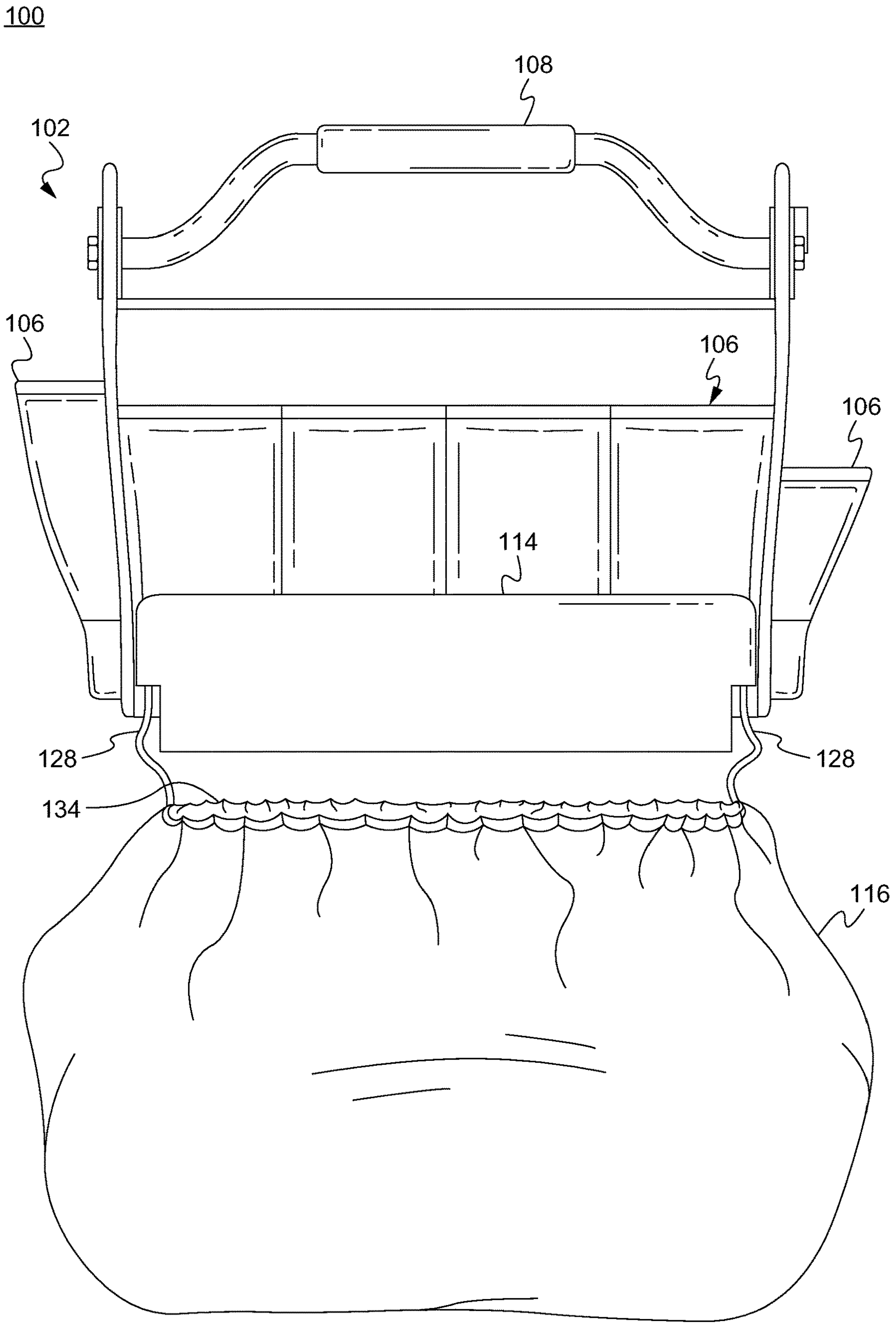
FIG. 1J illustrates a back view of the tool holder system with the cover sheet out coupled via multiple coupling bands according to some embodiments.

The cover sheet 116 is able to be coupled to the bag 102 and/or cover pouch 114 via one or more coupling lines 128. The coupling lines 128 are able to be positioned at an edge/hem 134 of the cover sheet 116 and couple to the cover pouch 114 in a location adjacent to the cutouts 130 of the cover pouch 114. Although FIGS. 1I and 1J show one and two coupling lines 128 and two cutouts 130, more or less coupling lines 128 and/or cutouts 130 are contemplated. For example, only a single cutout 130 and a single line 128 are able to be used. In the case where two coupling lines 128 and two cutouts 130 are used (as shown in the FIGS. 1B, 1F and 1J), the coupling lines 128 are able to couple to opposite ends of the edge of the cover sheet 116 and/or the cutouts 130 are able to be positioned on opposite ends of the cover pouch 114. In the case where a single coupling line 128 (and/or a single cutout 130) is used as shown in FIG. 1I, the coupling line 128 is able to couple to a single (right or left) end of the edge of the cover sheet 116 and/or the cutout 130 is able to be positioned on the same single end of the cover pouch 114. The coupling lines 128 are able to be a flexible and/or stretchable band. Alternatively, one or more of the coupling lines 128 are able to be flexible/stretchable or rigid, string, band, spring, cloth, plastic, nylon, other material or combination thereof. In some embodiments, the edge cover sheet In operation, the pouch fastener 132 is able to selectively close and open the pouch opening except for where the pouch cutouts 130 are located. Specifically, the cover sheet 116 is able to be held within the pouch cavity by closing the pouch fastener 132 after pushing the cover sheet 116 into the cavity. Further, when the cover sheet 116 is in use (enveloping the top and sides of the bag 102) or otherwise outside the pouch cavity, the pouch fastener 132 is still able to be closed with the cover sheet 116 able to remain coupled to the cover pouch 114 (and/or the wall inside the cover pouch 114) because the coupling lines 128 are able to extend through the pouch cutouts 130 (which remain open even when the fastener 132 is closed). As a result, the system 100 provides the advantage of enabling the tools and other items within the bag to be quickly protected using the cover sheet 116.

Although the cover pouch 114 and/or sheet 116 are shown extending from the opposite side as the bottom opening 122, the cover pouch 114 and/or cover sheet 116 are able to extend from any of the other surfaces of the bag 102 including within the primary compartment 110 or secondary compartment 112.

Figure 2:
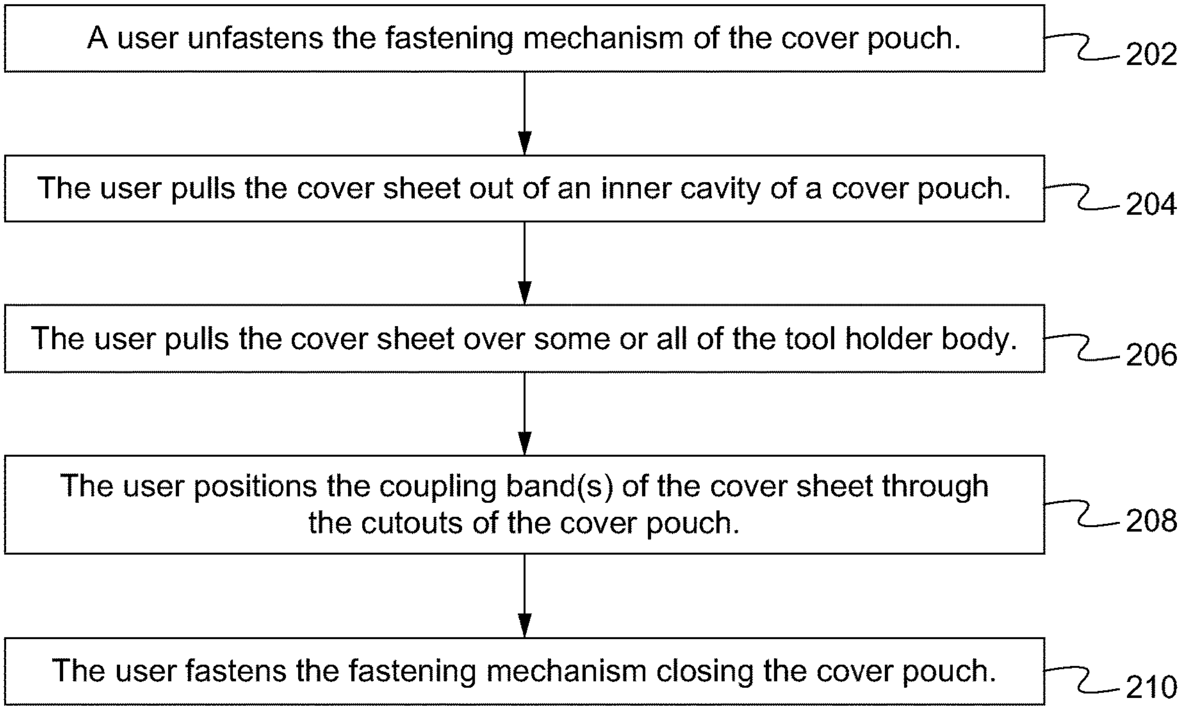
FIG. 2 is illustrates a method of using the tool holder system according to some embodiments.

FIG. 2 is directed to a method of using the tool holding system 100 according to some embodiments. As shown in FIG. 2, a user unfastens the pouch fastener 132 of the cover pouch 114 at the step 202. The user pulls the cover sheet 116 out of the pouch cavity of a cover pouch 114 at the step 204. The user pulls the cover sheet 116 over some or all of the tool holder body 102 at the step 206. In some embodiments, the user tightens or cinches the edge/perimeter 134 of the cover sheet 116 around the bottom of the too holder body 102 to keep it in place. Alternatively, the edge/hem 134 of the cover sheet 116 is able to be biasing in a tightened positioned (e.g. via an elastic edge/hem band), and pulling the cover sheet 116 over the body 102 comprises stretching the edge/hem 134 to fit over the body 102, moving the cover sheet 116 over the body 102 and releasing the edge/hem 134 such that it tightens around the body 102 (due to the biasing).

The user positions the coupling lines 128 of the cover sheet 116 through the cutouts 130 of the cover pouch 114 at the step 208. The user fastens the cover fastener 132 closing the cover pouch 114 at the step 210. It is understood that one or more of the above steps are able to be omitted and/or performed in a different order as desired by the user. For example, the user is able to refrain from re-fastening the fastening mechanism. As another example, the user is able to position the coupling bands before pulling the cover sheet over the body. In any case, the method provides the advantage of enabling a worker to protect their tools stored in the tool holder from dirt, saw dust, water and/or other elements by covering the tool holder body whenever such elements are present.

In use, a tool storage system and device, such as described above, has many applications. Particularly, the tool holder body is able to be manufactured from a variety of different materials and weights of materials configured for different tasks. Additionally, the exterior pockets, pouch, cover sheet and/or flap are able to be manufactured from different materials comprising one or more of leather, cotton, cotton/polyester blend, plastic, nylon, vinyl, neoprene, knit, and rubber. The primary storage compartment is able to be used to hold a variety of larger tools and accessories while the secondary storage compartment receives a parts bin capable of storing smaller tools and items, while allowing a user easy and convenient access to those objects. Particularly, it is advantageous to keep small parts next to the tools with which they are used while still keeping them separate for easy access. The pouch and cover sheet provide the advantage of enabling the tool holder to be covered at any time, for example, in a dusty workspace or inclement weather. Further, the one or more cutouts in the pouch enable the pouch to be sealed by the fastening mechanism even while the cover sheet is being used to cover the bag. Additionally, the handle allows for easy transportation of the tool storage system and device. Moreover, because the handle is bent and rotatably coupled to the holder body, it is able to rotate out of the way when a user wants to access the main compartment, but then rotate back into the middle for carrying the tool holder. Specifically, the tool storage system and device is configured to carry a variety of different articles as desired. Consequently, the tool storage system and device as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A tool holding system comprising:

a tool bag having a handle and a body comprising:

a primary storage compartment formed by a primary floor, a plurality of perimeter walls extending up from the primary floor and a top opening opposite the primary floor;

a secondary storage compartment formed by a secondary floor, a subset of the plurality of perimeter walls extending down from the primary floor to the secondary floor and a side opening opposite one of the subset of the plurality of perimeter walls;

a cover pouch having an inner cavity and a bottom opening facing a bottom of the body, the cover pouch extending from an outer surface of one of the plurality of perimeter walls; and a cover sheet coupled to the cover pouch via a flexible coupling band; and a parts bin configured to fit within the side opening and removably hold one or more tools.

2. The tool holding system of claim 1, wherein the cover pouch has a fastening mechanism and a cutout aperture, the fastening mechanism configured to seal the bottom opening except for the cutout aperture when fully closed.

3. The tool holding system of claim 2, wherein the flexible coupling band extends through the cutout aperture when the fastening mechanism is fully sealed and the cover sheet is positioned outside the inner cavity.

4. The tool holding system of claim 3, wherein the cover pouch has a second cutout aperture opposite the cutout aperture, the cover sheet has a second flexible coupling band, and the second flexible coupling band extends through the second cutout aperture when the fastening mechanism is fully sealed and the cover sheet is positioned outside the inner cavity.

5. The tool holding system of claim 4, wherein the subset of the plurality of perimeter walls extend a greater distance up from the primary floor to the top opening than down from the primary floor to the secondary floor.

6. The tool holding system of claim 5, wherein the cover pouch is positioned on the body opposite the side opening.

7. The tool holding system of claim 6, wherein the handle rotatably couples between two of the plurality of perimeter walls.

8. The tool holding system of claim 1, wherein a perimeter edge of the cover sheet has a maximum perimeter extension and includes a cinching mechanism that is able to bias the perimeter edge inwards from the maximum perimeter extension.

9. A tool holding system comprising:

a tool bag having a handle and a body comprising:

a primary storage compartment formed by a primary floor, a plurality of perimeter walls extending up from the primary floor and a top opening opposite the primary floor;

a secondary storage compartment formed by a secondary floor, a subset of the plurality of perimeter walls extending down from the primary floor to the secondary floor and a side opening opposite one of the subset of the plurality of perimeter walls;

a cover pouch having an inner cavity and a bottom opening, the cover pouch extending from an outer surface of one of the plurality of perimeter walls; and a cover sheet coupled to the cover pouch via a flexible coupling band; and a parts bin configured to fit within the side opening and removably hold one or more tools, wherein the cover sheet is able to crumple to fit within the cover pouch and to spread out to surround all of the tool bag except for a bottom of the tool bag below the secondary floor.

10. A tool bag for holding tools, the tool bag comprising:

a handle; and a body comprising:

a primary storage compartment formed by a primary floor, a plurality of perimeter walls extending up from the primary floor and a top opening opposite the primary floor;

a secondary storage compartment formed by a secondary floor, a subset of the plurality of perimeter walls extending down from the primary floor to the secondary floor and a side opening opposite one of the subset of the plurality of perimeter walls;

a cover pouch having an inner cavity and a bottom opening, the cover pouch extending from an outer surface of one of the plurality of perimeter walls; and a cover sheet coupled to the cover pouch via a flexible coupling band.

11. The tool bag of claim 10, wherein the cover pouch has a fastening mechanism and a cutout aperture, the fastening mechanism configured to seal the bottom opening except for the cutout aperture when fully closed.

12. The tool bag of claim 11, wherein the flexible coupling band extends through the cutout aperture when the fastening mechanism is fully sealed and the cover sheet is positioned outside the inner cavity.

13. The tool bag of claim 12, wherein the cover pouch has a second cutout aperture opposite the cutout aperture, the cover sheet has a second flexible coupling band, and the second flexible coupling band extends through the second cutout aperture when the fastening mechanism is fully sealed and the cover sheet is positioned outside the inner cavity.

14. The tool bag of claim 13, wherein the subset of the plurality of perimeter walls extend a greater distance up from the primary floor to the top opening than down from the primary floor to the secondary floor.

15. The tool bag of claim 14, wherein the cover pouch is positioned on the body opposite the side opening.

16. The tool bag of claim 15, wherein the handle rotatably couples between two of the plurality of perimeter walls.

17. The tool bag of claim 10, wherein a perimeter edge of the cover sheet has a maximum perimeter extension and includes a cinching mechanism that is able to bias the perimeter edge inwards from the maximum perimeter extension.

18. A tool bag for holding tools, the tool bag comprising:

a handle; and a body comprising:

a primary storage compartment formed by a primary floor, a plurality of perimeter walls extending up from the primary floor and a top opening opposite the primary floor;

a secondary storage compartment formed by a secondary floor, a subset of the plurality of perimeter walls extending down from the primary floor to the secondary floor and a side opening opposite one of the subset of the plurality of perimeter walls;

a cover pouch having an inner cavity and a bottom opening, the cover pouch extending from an outer surface of one of the plurality of perimeter walls; and a cover sheet coupled to the cover pouch via a flexible coupling band, wherein the cover sheet is able to crumple to fit within the cover pouch and to spread out to surround all of the tool bag except for a bottom of the tool bag below the secondary floor.

19. A method of using a tool holding system, the method comprising:

taking a cover sheet out of an inner cavity of a cover pouch of a tool bag, the tool bag having a handle and a body comprising a primary storage compartment formed by a primary floor, a plurality of perimeter walls extending up from the primary floor and a top opening opposite the primary floor, a secondary storage compartment formed by a secondary floor, a subset of the plurality of perimeter walls extending down from the primary floor to the secondary floor and a side opening opposite one of the subset of the plurality of perimeter walls, the cover pouch having the inner cavity and a bottom opening, the cover pouch extending from an outer surface of one of the plurality of perimeter walls and the cover sheet coupled to the cover pouch via a flexible coupling band; and pulling the cover sheet over the tool bag such that the cover sheet covers the tool bag.

20. The method of claim 19, wherein the cover sheet is able to crumple to fit within the cover pouch and to spread out to surround all of the tool bag except for a bottom of the tool bag below the secondary floor.

21. The method of claim 20, wherein the cover pouch has a fastening mechanism and a cutout aperture, the fastening mechanism configured to seal the bottom opening except for the cutout aperture when fully closed.

22. The method of claim 21, wherein taking the cover sheet out of the inner cavity includes positioning the flexible coupling band through the cutout aperture and fully sealing the fastening mechanism.

23. The method of claim 22, wherein the cover pouch has a second cutout aperture opposite the cutout aperture, the cover sheet has a second flexible coupling band, and the second flexible coupling band extends through the second cutout aperture when the fastening mechanism is fully sealed and the cover sheet is positioned outside the inner cavity.

24. The method of claim 23, wherein the subset of the plurality of perimeter walls extend a greater distance up from the primary floor to the top opening than down from the primary floor to the secondary floor.

25. The method of claim 24, wherein the cover pouch is positioned on the body opposite the side opening.

26. The method of claim 25, wherein the handle rotatably couples between two of the plurality of perimeter walls.

27. The method of claim 26, wherein a perimeter edge of the cover sheet has a maximum perimeter extension and includes a cinching mechanism that is able to bias the perimeter edge inwards from the maximum perimeter extension.

* * * * *